Aug. 12, 1969   G. L. BLACK, JR   3,460,330
APPARATUS FOR HARVESTING AGRICULTURAL CROPS
Filed Oct. 31, 1966   3 Sheets-Sheet 3

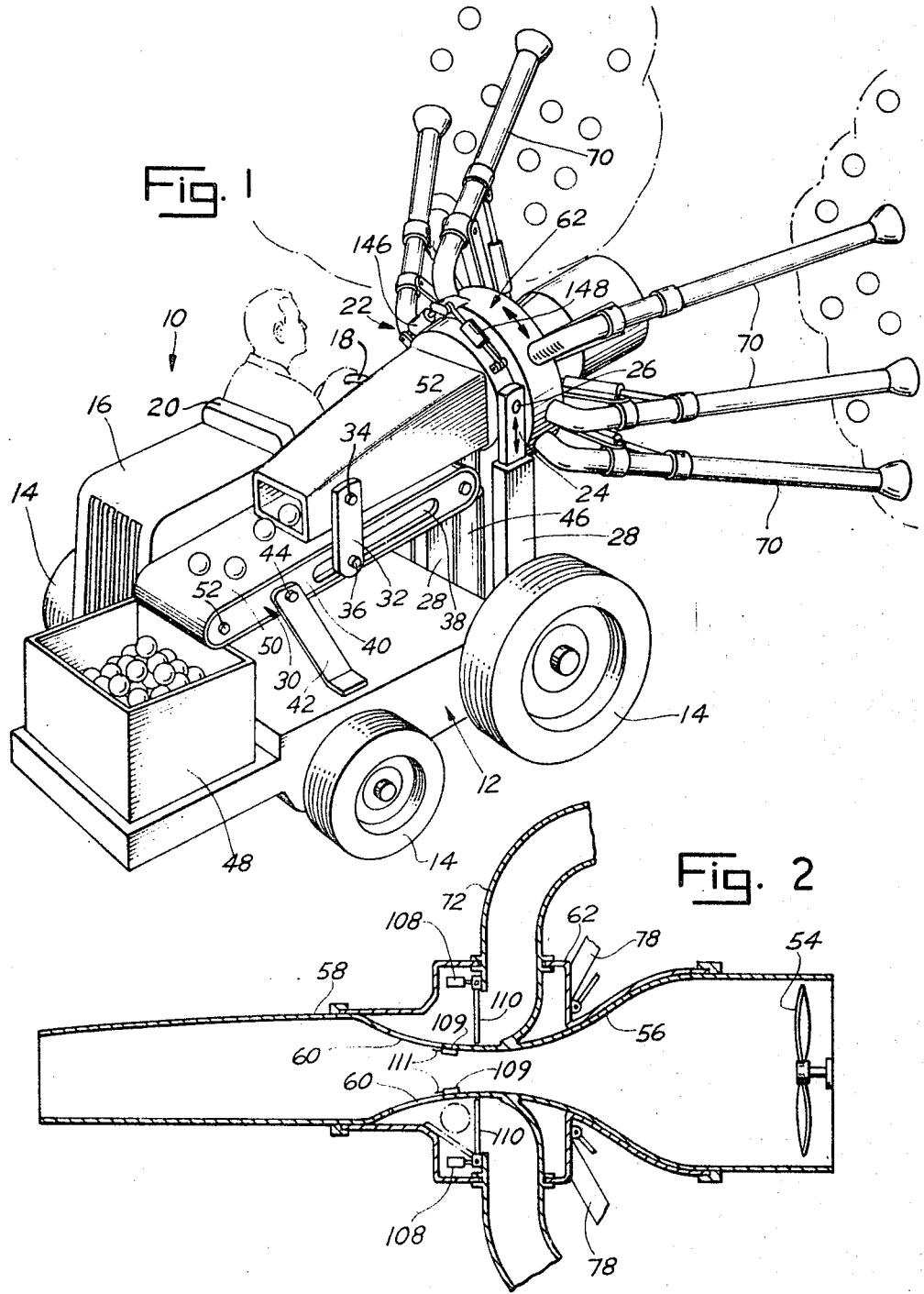

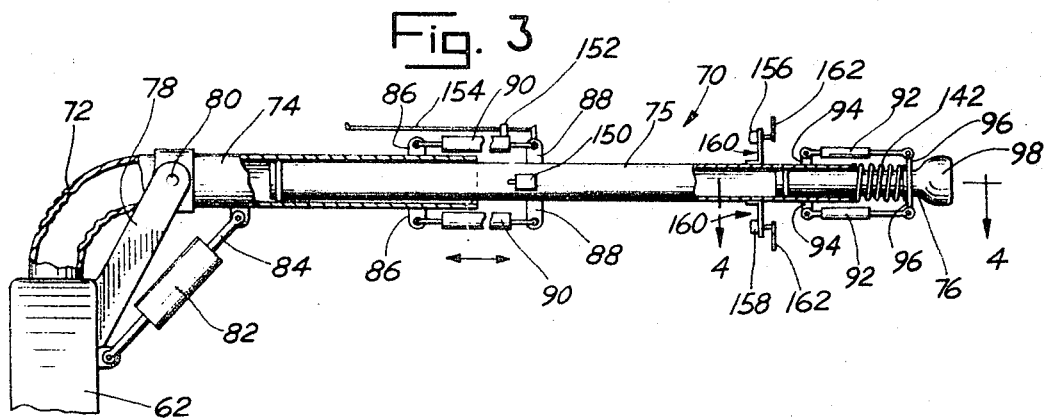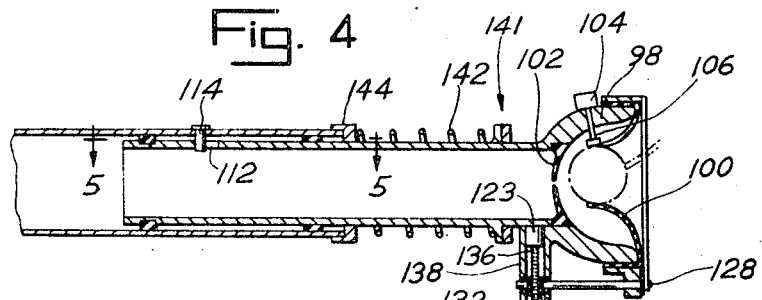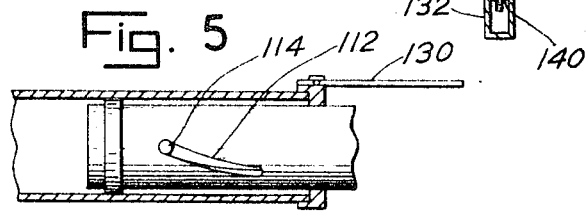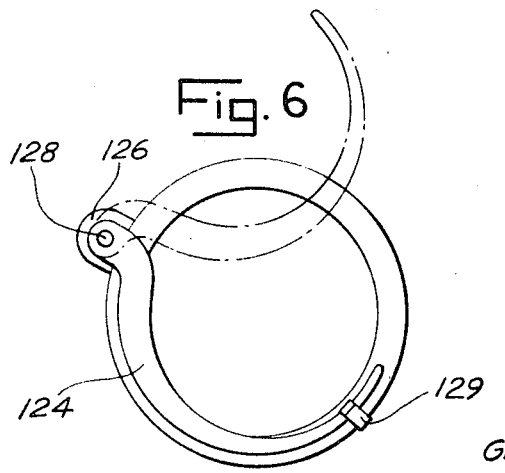

INVENTOR.
GEORGE L. BLACK JR.
BY Dominik, Stein & Knechtel
ATTORNEYS 3,460,330
APPARATUS FOR HARVESTING AGRICULTURAL CROPS
George L. Black, Jr., 405 Dunedin Ave., Temple Terrace, Fla. 33617
Filed Oct. 31, 1966, Ser. No. 590,730
Int. Cl. A01g *19/08*
U.S. Cl. 56—328          17 Claims

ABSTRACT OF THE DISCLOSURE

A mechanical harvester consisting of a plurality of vacuum picker arms which engage the fruit to suck the fruit, after cutting or disconnecting the stem of the fruit, to a collection box.

---

This invention relates to apparatus for mechanically harvesting agricultural crops, particularly tree fruit crops, such as citrus fruits.

In the past, numerous mechanical harvesters have been developed, however, each of them has been generally unsatisfactory, for one reason or another. For example, most of them are extremely complex in operation and have an exceptionally large number of moving parts so that they are difficult and costly to maintain. Furthermore, they do not provide or allow selectivity in picking fruit for desired size.

The mechanical harvester of the present invention may be operated as a semi-automatic unit to greatly accelerate the harvest capability of one man, or it can be operated completely automatically to perform the whole harvesting function, including placing the fruit in a vehicle for transportation to a loading or packaging station.

Each piece of fruit is picked individually from the tree and the heads of the picker arms are adapted to selectively pick fruit of only a certain size, in accordance with the diameter of the fruit. This latter feature is particularly important, for certain types of citrus fruits have a long bearing season and small unripe fruit is often found on a tree which is heavily loaded with mature fruit. Accordingly, the mechanical harvester must be able to distinguish the unripe fruit from the mature fruit, to prevent the former from being prematurely harvested.

The mechanical harvester completely eliminates the need to hand-pick the fruit. There therefore is no need for the pickers to mount ladders to reach the fruit in the trees, which is the normal practice at the present time. Furthermore, the mechanical harvester is adapted to pick the fruit with a twisting and pulling motion, to simulate the manner in which it is generally picked by hand.

An object of the present invention is to provide improved apparatus for mechanically harvesting agricultural crops, particularly tree fruit crops.

Another object is to provide improved mechanical harvesters having relatively few moving parts in comparison to the present available mechanical harvesters.

Still another object is to provide harvesters of the above character, which may be more easily maintained than presently available mechanical harvesters.

A further object is to provide harvesters of the above character which are adapted to selectively pick fruit of only a predetermined size.

A still further object is to provide harvesters of the above character which are adapted to pick fruit with a concurrent twisting and pulling motion, to simulate the manner in which the fruit is generally picked by hand.

Another object is to provide harvesters of the above character which may be operated both simi-automatically or completely automatically, to harvest a fruit crop.

Another object is to provide improved harvesters of the above character having means which may be individually operated, to perform a "clean-up" harvest to pick any mature fruit which may have been missed during automatic harvesting.

Another object is to provide harvesters of the above character which are adapted to place the fruit into a vehicle, a storage bin or the like, for subsequent transportion to a packaging station.

Other objects of the invention will in part be obvious and will in part appear hereinafter.

The above objectives are accomplished with a mechanical harvester which includes, generally, a wheeled, motorized chassis having a blower assembly mounted on it. The blower assembly includes a vacuum collar which has a number of movable tubular picker arms affixed to it, in spaced relation about its periphery. The blower assembly is designed to create a vacuum within the vacuum collar, which vacuum is selectively directed into respective one of the tubular picker arms, through the action of the picker arm engaging fruit of a size which is to be picked. The fruit, upon being picked, is transported through the picker arms and, ultimately, deposited in a storage bin removably attached to the chassis.

The individual tubular picker arms are pivotally movable in any direction within a predetermined range, and are extendable and retractable, all automatically through control means which are preferably hydraulic in operation. Each of the picker arms has a predetermined size head on its end which is replaceable to selectively pick fruit of a predetermined diameter. The fruit upon entering the heads on the picker arms activate control means to apply vacuum to the hollow tubular interior thereof, to effectively "lock" onto the fruit. Simultaneously, control means are activated to retract the head, with a twisting motion, to pull the fruit from the tree. Cutter means can be incorporated into each of the heads, to cut the stem of the fruit as it is being pulled from the tree.

A semi-automatic picker arm is also preferably affixed to the vacuum collar, which picker arm is movable by an operator to perform a "clean-up" harvest to pick any fruit missed by the automatically operated picker arms or to spot pick fruit of desired size.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view illustrating a mechanical harvester which is exemplary of the invention;

FIG. 2 is a sectionalized plan view of the blow assembly of the mechanical harvester of FIG. 1;

FIG. 3 is a partial view of the mechanical harvester, illustrating the construction of one of the automatically operated picker arms;

FIG. 4 is an enlarged sectional view, taken along lines 4—4 of FIG. 3;

FIG. 5 is a partial view of a section of a picker arm, illustrating the manner in which a twisting motion is imparted to the heads thereof;

FIG. 6 is an end view of one of the heads, illustrating the cutter affixed thereto;

Figure 7:
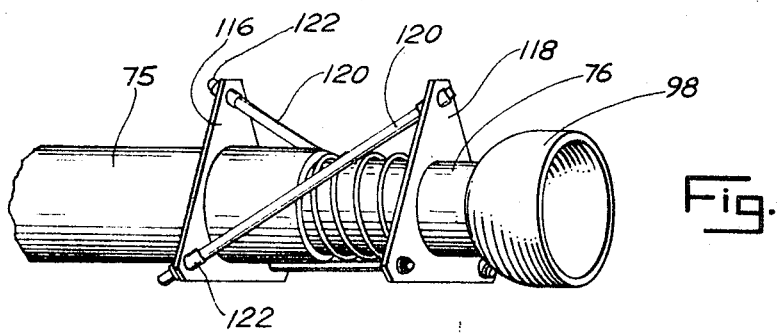
Figure 8:
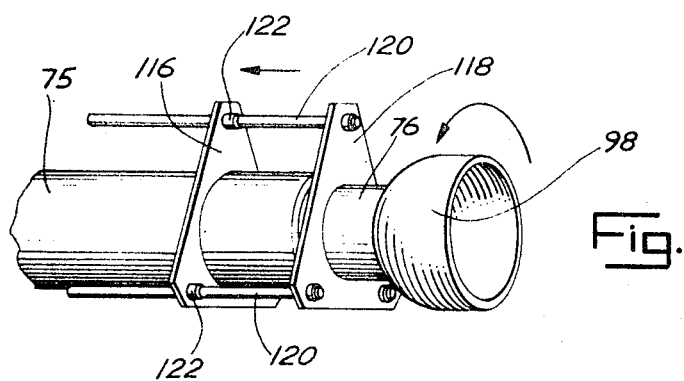
Figure 9:
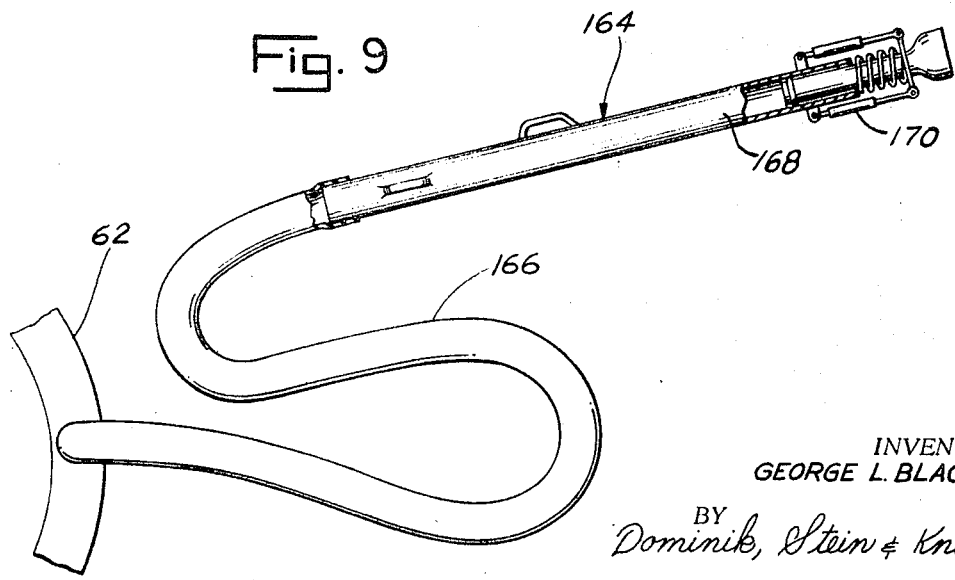

FIGS. 7 and 8 each are partial views of a picker arm, illustrating an alternative construction for imparting a twisting motion to the heads; and FIG. 9 is a perspective view illustrating the semiautomatic picker arm of the mechanical harvester, and the manner in which it may generally be used to harvest the fruit in a "clean-up" or "spot-pick" operation.

Similar reference characters refer to similar parts throughout the several views of the drawings.

Referring now to the drawings, in FIG. 1 there is illustrated a mechanical harvester 10 exemplary of the present invention, including a chassis 12 having ground engaging wheels 14, motor means (not shown) protectively enclosed within a cover box 16, a steering wheel 18, and a seat 20 for an operator. Also affixed to the chassis 12 are transmission and steering means (not shown), both of which may be of standard or conventional design, for driving and steering the wheels 14 to propel the harvester 10, in the fashion in which most motorized vehicles can be propelled.

A blower assembly 22 is mounted atop the chassis 12, by means of a pair of guide bars 24 (only one of which is shown) pivotally affixed with pivot pins 26 to the opposite sides thereof and slidably retained within a pair of vertically disposed tubular supports 28. Beneath the blower assembly 22 is a conveyor assembly 30 which is affixed thereto by means of a pair of lever arms 32 (only one of which is shown). One end of each of the lever arms 32 is pivotally affixed to opposite sides of the blower assembly by means of pivot pins 34, and the opposite ends thereof are affixed together and to the conveyor assembly 30 by means of a guide rod 36 which extends through elongated slots 38 formed in conveyor side plates 40 (only one of which is shown). The guide rod 36 supports one end of the conveyor assembly 30 and a pair of supports 42 (only one of which is shown) which are pivotally affixed by pivot pins 44 to respective ones of the side plates 40 and fixedly secured to the chassis 12, support the other end of the conveyor assembly. Hydraulic means 46 is affixed to the blower assembly and is automatically and periodically operated to raise and lower it. The guide bars 24 slide within the supports 28 to maintain and support the blower assembly in alignment during such movements. Also, when the blower assembly 22 is raised or lowered, the guide bar 36 slides within the elongated slots 38 to raise and lower the forward or front end of the conveyor assembly 30 so that the latter is maintained in close working relationship with the discharge end of the blower assembly. With this arrangement, the fruit being discharged is more directly deposited on the conveyor assembly and is not dropped a substantial height to the conveyor assembly, which drop may bruise the fruit.

The fruit is transported by the conveyor assembly 30 to a storage bin 48 which is removably affixed to the chassis 12, so that it can be easily replaced with another storage bin when filled. Alternatively, the conveyor assembly can be adapted to deposit the fruit directly into a wagon or the like, pulled or parked by the harvester. The conveyor assembly 30 is preferably of the type having a continuous belt 50 which is looped about a pair of rollers (not shown) having axles 52 (one of which is energized) rotatably supported by the conveyor side plates 40, however, other conveyor structures can be used also.

The blower assembly 22, as can be best seen in FIG. 2, has a shell 56 in which a fan blade 54, that is driven by motor means (not shown), is mounted. The shell 56 forms a discharge chute 58 at its one end and is constricted, near its middle, in a fashion such as to form a venturi nozzle which creates a vacuum therein, in the manner well known in the art. Just forward of the constricted portion, the shell 56 has apertures 60 formed therein and a collar 62 is rotatably affixed with appropriate sealing means about the shell 56 and positioned substantially circumferentially about the apertures 60 so that a vacuum is created within the interior of the collar.

Affixed to the collar 62, in radial spaced relation, are a number of picker arms 70, which can be best seen in FIG. 3. Each of the picker arms 70 is of hollow tubular construction and has a flexible end connector 72 which is affixed to the collar 62 and three rigid arm sections 74–76 which are telescopically arranged within one another so that they may be extended and retracted, in the manner more fully described below. A U-shaped support bracket 78 is affixed to the collar 62 and the end of the arm section 74 is pivotally affixed and supported therein by pivot pins 80. A hydraulic cylinder 82 is pivotally affixed to the collar 62 and its piston 84 is pivotally affixed to the arm section 74, which hydraulic cylinder is operated to continuously raise and lower the picker arm 70, about the pivotal connecting point formed by the pivot pin 80.

Bracket pairs 86 and 88 are affixed to the arm sections 74 and 75, respectively, and between respective ones of each of the bracket pairs 86 and 88 are connected hydraulic cylinders 90. The hydraulic cylinders 90 are operable to extend and retract the arm section 75. Preferably, a pair of hydraulic cylinders 92 are likewise connected between brackets 94 and 96 affixed to the arm sections 75 and 76, respectively, for extending and retracting the arm section 76.

Each of the picker arms 70 has a replaceable cup-shaped head 98 on the end of its arm section 76, which head 98 has a flexible sleeve 100 that forms a substantially closed recessed cavity of a predetermined size in the head. A flexible diaphragm-like split disc 102 is affixed over the end of the arm section 76. The sleeve 100 and the disc 102 cooperate to prevent loss of vacuum, during the time a piece of fruit traverses the length of the picker arm 70.

A microswitch 104 is affixed to each of the heads 98, with its contact 106 extending into the space behind the sleeve 100 so as to be operated by a piece of fruit of proper size engaged within the recessed cavity formed by the sleeve 100. The microswitches 104 are operative to energize solenoids 108 affixed to the collar 62, which solenoids upon being operated remain operated until released by the operation of microswitches 109. The solenoids 108 in turn are operative to open gates 110 that normally close the ends of the tubular picker arms 70, to cut off the source of vacuum to them. The microswitches 104 are further adapted to operate control valves (not shown) controlling the flow of hydraulic pressure to the hydraulic cylinders 92, to cause the hydraulic cylinders 92 to operate to retract the arm sections 76.

A twisting motion is imparted to the arm sections 76 upon being retracted so that the fruit engaged by the heads 98 are picked with a pulling and twisting motion, generally simulating the manner in which the fruit is picked by hand. One manner in which this twisting motion is provided is illustrated in FIG. 5, wherein it can be seen that the arm sections 76 each have one or more elongated arcuate slots 112 formed therein, in which a pin 114 affixed to the arm section 75 is slidably engaged. As the arm section 76 is retracted, the pin 114 slides within the slot 112 and the arm section 76 is caused to rotate with respect to the arm section 75.

In FIGS. 7 and 8 there is illustrated an alternative construction for imparting the twisting motion to the heads 98. In FIGS. 7 and 8, triangular-shaped plates 116 and 118 are affixed to the arm sections 75 and 76, respectively, and guide rods 120 are affixed at one end thereof to the plate 118, at its corners. The opposite ends of each of the guide rods 120 are slidably retained within and extended through a sleeve 122 affixed within a corner of the plate 116 which is offset 120° so that the guide rods are angularly disposed, as illustrated. With this arrangement, as to the guide bars 120 are drawn through the sleeves 122 when the arm section 76 is retracted, in the manner described above, a rotary motion is imparted to the plate 118 and hence the arm section 76 and its head 98, as illustrated in FIG. 8.

A cutter in the form of a semi-circular shaped blade 124 can be affixed to the heads 98, to cut the stems of the fruit to assure severance thereof from the trees. The blades 124 are pivotally affixed by means of spring-loaded pivot pins 128 to brackets 126 attached to the heads 98, as illustrated in FIG. 6, so as to normally bias or cock the blades to sweep across the cup-shaped openings of the heads when they are released. The blades 124 are retained in the biased, cocked position by locks 129 which are operated to release the blades to cut the stems of fruit when the arm sections 76 are moved to their retracted position. At this time, cam levers 130 (FIG. 5) in the form of a bar or rod affixed to the arm sections 75 engage and move the locks 129 slightly outward to effect release of the blades 124 and the spring-loaded pivot pins 128 cause the blades 124 to pivotally swing across the mouth of the head.

The blades 124 can be re-cocked in any appropriate fashion, one of which is illustrated in FIG. 4. A solenoid 123 having a gear rack 138 forming its operable rod 136 is retained within a sleeve 132 affixed to the arm section 76. The spring-loaded pivot pin 128 extends through the sleeve 132 and has a gear 140 affixed to it which is drivingly engaged with the gear rack 138. In operation, the rod 136 is drawn into the sleeve 132, by the action of the gear 140 engaging the gear rack 138, when the blade 124 is released to cut the stems of fruit. A switch (not shown) is positioned to be operatively engaged by the blade 134 to momentarily energize the solenoid 123 to draw its operable rod 136 upwardly (as illustrated), which action, in turn, causes the gear rack 138 to turn the gear 140, and hence the pivot pin 128, to re-cock the blade 124.

Also, springs 142 are preferably affixed about the arm sections 76 in a fashion such as to be engageable by the brackets 96 on the arm sections 76 and collar caps 144 on the ends of the arm sections 75. As the arm sections 76 are retracted, the springs are compressed to bias the arm sections 76 to return them rapidly to the extended position. The brackets 96 abut against flanges 141 on the arm sections 76 but are freely secured to the arm sections so as to permit the latter to rotate as they are retracted.

The picker arms 70 each are caused to "hunt" automatically, and independently of one another by means of hydraulic cylinders and limit switches which operate control valves to control the flow of hydraulic pressure to them. The picker arms 70 all are periodically rotated simultaneously clockwise and then counter-clockwise in an oscillatory manner, by means of a pair of hydraulic cylinders 146 and 148 connected to the collar 62. The hydraulic cylinders 146 and 148 each complement the action of the other to rotate the collar 62 approximately 30° in opposite directions from an initial starting point, or in other words, through an angle of 60°.

In addition to being rotated, each of the picker arms 70 is independently and automatically extended and retracted in a continuous fashion, by means of travel limit switches 150 and 152 affixed to the arm sections 75 and to the hydraulic cylinders 90, respectively. The limit switches 150 are adapted to be engaged and operated by the ends of the arm sections 75 while the limit switches 152 are engaged and operated by the ends of lever bars 154 affixed to the brackets 88, to reverse the flow of hydraulic pressure to the hydraulic cylinders 90, when the arm sections 75 are fully retracted and fully extended, respectively.

Limit switches 156 and 158 also are affixed to flange brackets 160 attached to the arm sections 75, near their ends. These limit switches have levers 162 affixed to their respective contacts which are adapted to engage obstructions such as the branches of a tree to control the movement of the picker arms 70. Limit switches 156 and 158 each are adapted to override the limit switches 150 and 152, to operate the control valves for the hydraulic cylinders 90, to automatically reverse the directions of hydraulic pressure supplied to them.

The operation of the mechanical harvester 10 is generally described as follows. The motor means (not shown) is started and the harvester is driven, in conventional fashion, down a path between two rows of fruit trees, as illustrated in FIG. 1. The hydraulic system for the harvester including the connections to the hydraulic cylinders, the solenoid operated control valves, and the electrical connections to the limit switches all may be conventional in design and construction, and accordingly, for the sake of simplicity, have not been shown. When positioned with proper relation to the fruit trees, the hydraulic system and the blower assembly 22, or more particularly, the motor means for the fan blade 54 are activated to start the "hunting" action of the picker arms 70 and to create the vacuum within the collar 60. The hydraulic cylinders 146 and 148 oscillate or rotate the collar 62 and hence the picker arms 70, in the manner described above. Simultaneously, each of the picker arms 70 is extended and retracted, under control of the hydraulic cylinders 90 and the limit switches 150, 152, 156 and 158, and are raised and lowered under control of the hydraulic cylinders 82. It can therefore be seen that the picker arms 70 each are constantly "sweeping" in all directions in search for the fruit on the tree.

When a piece of fruit is engaged within the cup-like opening formed by the sleeve 100 on a head 98, is illustrated in FIG. 4, the microswitch 104 is operated to, in turn, operate the solenoid 108 which opens the gate 110 controlling the vacuum flow to the picker arm. The solenoid 108 remains operated until the microswitch 109 is operated to restore it. Simultaneously, the microswitch 104 operates the control valves controlling the flow of hydraulic pressure to the hydraulic cylinders 92 to operate them to cause the arm section 76 to be retracted.

With a vacuum supplied to the picker arm 70, the fruit is "sucked" further into the head 98 and held therein as the arm section 76 is retracted. The arm section 76 has a twisting motion imparted to it as it retracts, by the arrangement illustrated in FIGS. 5, or FIGS. 7 and 8. If the fruit is not severed from the tree by the time that the arm section 76 is retracted, the lock 129 for the cutter or blade 124 is operated by the cam lever 130 to release the blade 124 and the stem will be severed.

The fruit is then free to be "sucked" through the picker arm 70, by the vacuum within the collar 62. When the fruit passes through the aperature 60, it engages the contact 111 of the microswitch 109, thereby releasing the solenoid 108 to close the gate 110. The fruit then passes out of the discharge chute 58 and onto the conveyor assembly 30 which transports it to and deposits it in the storage box 48.

As soon as the fruit passes from the head 98 into the interior of the picker arm 70, the microswitch 104 is restored and thereby releases or restores the control valve for the hydraulic cylinders 92. Hydraulic pressure is no longer supplied to them to retract the arm section 76, and the spring 142 which is now compressed quickly and forcibly urges the arm section 76 to its normally extended position.

In FIG. 9 there is illustrated a picker arm 164 which may be used to perform a "clean-up" operation to harvest any fruit missed by the picker arms 70, or to "spot-pick" fruit of desired size. The picker arm 164 is coupled to the collar 62 by a flexible tube 166 of sufficient length to permit the picker arm 164 to be freely moved about. The picker arm 164 has only two telescoping arm sections 168 and 170 which correspond to the arm sections 75 and 76 respectively. The length of the arm section, in this case, however, is substantially the same as the combined length of the arm sections 74 and 75 of the picker arms 70. The arm sections 168 and 170 of the picker arm 164 are adapted to operate, with respect to one another, in the same manner as described above. Since the picker arm 164 is intended to be manipulated by hand, the hydraulic cylinders 90, limit switches 150, 156 and 158 and the like, for automatically moving the picker arms 70, can be eliminated. In all other respects, the operation of the picker arm 164 in harvesting the fruit from a tree is the same as described above.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described, what is claimed is:

1. A mechanical harvester for harvesting agricultural crops comprising, in combination: a blower assembly adapted to be transported; discharge means affixed to said blower assembly; a collar affixed about said blower assembly; a plurality of tubular picker arms affixed to said collar in radial spaced relation about its periphery, each of said picker arms having at least one arm section which is normally extended and movable longitudinally to a retracted position, a cup-shaped head of a predetermined size on the end of each of said movable arm sections; said blower assembly being of a construction to create a vacuum within said collar which is coupled through said tubular picker arms to said heads; switch means affixed to said heads and positioned therein to be operated by an agricultural crop of a diameter to be received therein, means operated under the control of said switch means to retract said movable arm sections; means for imparting a twisting motion to said movable arm sections as said arm sections are being retracted; said agricultural crop being held within said head by said vacuum and being simultaneously pulled and twisted as said movable arm section is retracted to sever said agriculatural crop, said agricultural crop upon being severed traveling through said picker arm to said discharge means and expelled thereby.

2. The mechanical harvester of claim 1 further including a motorized chassis having ground engaging wheels which are drivable and steerable to convey said chassis, said blower assembly being affixed to said chassis for transporting it.

3. The mechanical harvester of claim 2 further including conveyor means affixed to said chassis and positioned with respect to said discharge means to transport agricultural crops expelled therefrom to storage means.

4. The mechanical harvester of claim 2 further including means affixed to said chassis and to said blower assembly which are operated to periodically pivotally raise and lower said blower assembly.

5. The mechanical harvester of claim 4 further including conveyor means for transporting agricultural crops expelled from said discharge means to storage means, said conveyor means being pivotally affixed at one end thereof to said chassis and at the other end thereof to said discharge means and automatically positionally adjusted to a position in close proximity with respect to said discharge means when said blower assembly is raised and lowered to eliminate droppage of said agricultural crop from a height which may bruise said agricultural crop when it is expelled onto said conveyor means.

6. The mechanical harvester of claim 1 further including means affixed to said blower assembly and to said collar which are operable to periodically rotate said collar about said blower assembly between predetermined angular positions in an oscillatory manner.

7. The mechanical harvester of claim 1 wherein each of said plurality of picker arms is flexibly coupled to said collar, and further includes means affixed to said blower assembly and to said picker arms which are operated to periodically pivotally raise and lower said picker arms between predetermined angular positions in an oscillatory manner.

8. The mechanical harvester of claim 1 wherein each of said plurality of picker arms includes at least three movable arm sections telescopically arranged with respect to one another, first means affixed to two of said arm sections operated to periodically extend and retract said two arm sections with respect to one another between predetermined limits, one of said two arm sections being telescopically coupled to said arm section having said head affixed to it.

9. The mechanical harvester of claim 8 further including switch means affixed to each of said picker arms and positioned to be operated by obstructions encountered override said first means affixed to said two arm sections to automatically reverse the mode of operation thereof.

10. The mechanical harvester of claim 1 further including gate means controlling the supply of vacuum from said collar to said picker arms, said gate means being normally closed and operated to open under control of said switch means to couple the vacuum to said picker arms.

11. The mechanical harvester of claim 10 wherein said gate means upon being operated remain operated until restored, said harvester further including switch means operated by an agricultural crop as said agricultural crop passes through said gate means to restore said gate means.

12. The mechanical harvester of claim 1 further including a cutting blade which is pivotally affixed to said head and normally biased to pivotally sweep across the open end of said head when released, lock means for retaining said cutting blade in said normally biased position, lock release means operable to release said lock retaining said cutting blade, and means for restoring said cutting blade to its normally biased position.

13. The mechanical harvester of claim 12 further including lever actuator means affixed to said picker arms and positioned to engage and to operate said lock release means when said arm section having said head affixed to it is retracted.

14. The mechanical harvester of claim 1 wherein said means for imparting a twisting motion to said movable arm sections comprises an arcuate slot formed in said movable arm section and a pin affixed to said picker arm and slidably engaged within said slot, whereby upon retraction of said movable arm section said pin slides in said slot and causes said movable arm section to rotate between predetermined limits.

15. The mechanical harvester of claim 1 wherein said means for imparting a twisting motion to said movable arm sections comprises a pair of plate members affixed to said picker arm and to said movable arm sections, respectively, and a plurality of guide rods which are angularly disposed, with one end thereof affixed to one of said plate members and the opposite end thereof slidably received within the other one of said plate members, whereby upon retraction of said movable arm section the ends of said guide rods slide through said one plate member and cause said movable arm section to be rotated between predetermined limits.

16. The mechanical harvester of claim 1 further including at least one picker arm which is adapted to be operated by hand semi-automatically, said one picker arm being coupled to said collar by means of a flexible tube of sufficient length to permit said picker arm to be freely moved about and having a movable arm section on its end, a cup-shaped head of a predetermined size on the end of said movable arm section; switch means affixed to said head and positioned therein to be operated by an agricultural crop of a selected diameter to be received therein, means operated under control of said switch means to retract said movable arm section; means for imparting a twisting motion to said movable arm section as said arm section is being retracted, said agricultural crop being held within said head by said vacuum and being simultaneously pulled and twisted as said movable arm section is retracted to sever said agricultural crop, said agricultural crop upon being severed traveling through said picker arm and said flexible tube to said discharge means and expelled thereby.

17. The mechanical harvester of claim 1 where said cup-shaped head is adjustable to selectively harvest desired size fruit.

References Cited

UNITED STATES PATENTS

| | | | |
|---|---|---|---|
| 1,691,146 | 11/1928 | Boggs | 56—13 XR |
| 2,131,672 | 9/1938 | Rich | 56—328 |
| 2,545,072 | 3/1951 | Denman | 56—332 |
| 2,680,338 | 6/1954 | Space | 56—13 |
| 2,711,625 | 6/1955 | Bullock | 56—332 |
| 2,775,088 | 12/1956 | Bullock | 56—332 |
| 3,165,880 | 1/1965 | Buie | 56—336 |
| 3,200,575 | 8/1965 | Hurst | 56—328 |
| 3,303,638 | 2/1967 | Koehn | 56—330 |

RUSSELL R. KINSEY, Primary Examiner

PO-1050
(5/69)

UNITED STATES PATENT OFFICE
CERTIFICATE OF CORRECTION

Patent No. 3,460,330          Dated August 12, 1969

Inventor(s) George L. Black, Jr.

It is certified that error appears in the above-identified patent and that said Letters Patent are hereby corrected as shown below:

Claim 9, column 8, line 10, after "encountered" insert --by said picker arms, said switch means being adapted--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents